US008635757B2

(12) United States Patent
Bartsch et al.

(10) Patent No.: US 8,635,757 B2
(45) Date of Patent: Jan. 28, 2014

(54) METHOD FOR THE INSTALLATION OF AN APPARATUS FOR SPRING-ASSISTED SWINGING OF A LIFTGATE OR DOOR IN A VEHICLE

(75) Inventors: Knut Bartsch, Ebersberg (DE); Franz Sinseder, Dorfen (DE); Manfred Schindler, Markt Schwaben (DE); Franz Binder, Lenting (DE); Jürgen Sendtner, Denkendorf-Zandt (DE)

(73) Assignee: Audi AG, Ingolstadt (DE)

( * ) Notice: Subject to any disclaimer, the term of this patent is extended or adjusted under 35 U.S.C. 154(b) by 130 days.

(21) Appl. No.: 13/161,015

(22) Filed: Jun. 15, 2011

(65) Prior Publication Data

US 2012/0144646 A1 Jun. 14, 2012

(30) Foreign Application Priority Data

Jun. 16, 2010 (DE) ......................... 10 2010 023 971

(51) Int. Cl.

*B23P 11/00* (2006.01)
*B23P 17/00* (2006.01)
*B62D 33/00* (2006.01)
*B60J 5/10* (2006.01)
*E05F 1/10* (2006.01)
*E05F 1/00* (2006.01)
*E06B 3/00* (2006.01)

(52) U.S. Cl.

USPC .................. 29/525.01; 29/525.13; 29/525.08; 29/434; 29/436; 29/428; 296/56; 296/76; 296/146.8; 49/386; 49/387; 49/506

(58) Field of Classification Search

USPC .............. 29/525.01, 525.13, 25.08, 428, 434, 29/436; 296/56, 76, 146, 146.8, 146.11; 49/386, 387, 506

See application file for complete search history.

(56) References Cited

U.S. PATENT DOCUMENTS 4,947,964 A * 8/1990 Husmann ...................... 187/319
5,373,665 A * 12/1994 Lyons, Sr. ........................ 49/386
5,613,308 A * 3/1997 Little .............................. 37/445
5,730,239 A * 3/1998 Holter ........................ 180/69.21
6,018,912 A * 2/2000 Baughman et al. ............. 49/386
6,419,293 B1 * 7/2002 Nicholas et al. ................ 296/76
6,517,128 B2 * 2/2003 Perkins et al. ................ 292/216
6,550,839 B2 * 4/2003 Rogers et al. ................... 296/56
7,287,799 B2 * 10/2007 Austin ......................... 296/57.1
7,673,929 B2 * 3/2010 Patzer et al. ............. 296/146.11
8,182,055 B2 * 5/2012 Yun et al. ...................... 312/405
2002/0033613 A1 * 3/2002 Auer et al. ...................... 296/76
2004/0040213 A1 * 3/2004 McCarthy-Garland et al. ............................... 49/341
2006/0071501 A1 * 4/2006 Ablabutyan et al. ............ 296/56

(Continued)

FOREIGN PATENT DOCUMENTS

WO WO 2010/025817 3/2010

*Primary Examiner* — Essama Omgba
*Assistant Examiner* — Darrell C Ford
(74) *Attorney, Agent, or Firm* — Henry M. Feiereisen LLC

(57) ABSTRACT

A method for installing a spring-assisted liftgate in opposition to the gravity force includes temporarily fixing a coupling rod in a defined position corresponding to an installation position of the liftgate, and holding the in an open position or in an intermediate position above the installation position and placing the apparatus in the vehicle. After lowering the liftgate from the open position or intermediate position into the installation position, the coupling rod is connected to the hinge lever and then released.

9 Claims, 2 Drawing Sheets

(56) References Cited

U.S. PATENT DOCUMENTS

| | | | | |
|---|---|---|---|---|
| 2007/0057532 | A1* | 3/2007 | McIntyre et al. | 296/146.8 |
| 2009/0058131 | A1* | 3/2009 | Smith et al. | 296/146.11 |
| 2009/0282648 | A1* | 11/2009 | Lee | 16/297 |
| 2011/0131886 | A1* | 6/2011 | Durr | 49/386 |
| 2011/0163554 | A1* | 7/2011 | Patel | 292/216 |
| 2011/0308166 | A1* | 12/2011 | Binder et al. | 49/386 |
| 2011/0314739 | A1* | 12/2011 | Kaburaki | 49/70 |
| 2012/0144646 | A1* | 6/2012 | Bartsch et al. | 29/428 |

* cited by examiner

METHOD FOR THE INSTALLATION OF AN APPARATUS FOR SPRING-ASSISTED SWINGING OF A LIFTGATE OR DOOR IN A VEHICLE

CROSS-REFERENCES TO RELATED APPLICATIONS

This application claims the priority of German Patent Application, Serial No. 10 2010 023 971.2, filed Jun. 16, 2010, pursuant to 35 U.S.C. 119(a)-(d), the content of which is incorporated herein by reference in its entirety as if fully set forth herein.

BACKGROUND OF THE INVENTION

The present invention relates to the installation of an apparatus for spring-assisted swinging of a liftgate or door.

The following discussion of related art is provided to assist the reader in understanding the advantages of the invention, and is not to be construed as an admission An apparatus of a type involved here is used in the automobile industry to minimize operating forces during swinging of a liftgate or door in opposition to the gravity force between a closed position and an open position and optionally to maintain the liftgate or door in one or more opening positions. Installation of such an apparatus in vehicles has been proven complex and especially handling of such an apparatus with prestressed spring energy store has been shown problematic.

It would therefore be desirable and advantageous to provide a method for installation of an apparatus for spring-assisted swinging of a liftgate or door in a vehicle, which method is easy, rapidly and reliably to implement.

SUMMARY OF THE INVENTION

According to one aspect of the present invention, a method for installation of an apparatus for spring-assisted swinging of a liftgate or door in opposition to the gravity force between a closed position and an open position in a vehicle, with the apparatus including a spring energy store and a tracker which is coupled to the spring energy store for influencing a torque generated by the spring energy store and includes a coupling rod for rotatable actuation of a hinge lever articulated to a body of the vehicle and operably connected to the liftgate or door, includes the steps of temporarily fixing a coupling rod of the tracker in a defined position in correspondence to an installation position of the liftgate or door, holding the liftgate or door in the open position or in an intermediate position above the installation position, placing the apparatus in the vehicle, lowering the liftgate or door from the open position or intermediate position into the installation position, connecting the coupling rod to the hinge lever, and releasing the coupling rod.

As it can easily be installed in the vehicle, the apparatus can be substantially assembled off-site. There is no need for complicated installation in tight spaces of the vehicle body, and the apparatus can thus be prefabricated with prestressed and preset spring energy store for subsequent installation in the vehicle. For that purpose, the coupling rod is fixed, directly or indirectly, in a defined position. The defined position corresponds to the position which the coupling rod would assume when connected to the liftgate or door in the installation position. The vehicle can undergo in the meantime any desired process steps beforehand, for example galvanizing or painting, while the liftgate or door has already been secured so that the liftgate or door can be treated in a same way as the remaining body. The liftgate or door is hereby swingably mounted to the body of the vehicle via hinge levers arranged on both sides of the body. Installation of the apparatus in the vehicle is implemented by swinging the liftgate or door to its open position or an intermediate position between installation position and open position and by holding it in place. The prefabricated apparatus is then installed in the vehicle and fastened. Subsequent lowering of the liftgate or door into the installation position causes the respective hinge lever to contact the associated coupling rod, and the hinge lever can then be connected with the coupling rod. Removing the previously provided temporary fixation of the coupling rod releases the apparatus and the spring energy store assumes the further support of the liftgate or the door. The torque transmitted by the spring energy store is converted in the tracker to an appropriate countermoment which is made available at the hinge lever and opposes the gravity moment which depends on the opening angle of the liftgate or door. A suitable configuration of the tracker renders it possible for example for the liftgate or door to maintain its position in any position along the swinging path. Examples of a suitable door includes a door which is swingable about a rotation axis extending horizontally transversely to the vehicle, such as e.g. a scissors-type door.

According to another advantageous feature of the present invention, the installation position may correspond to half an opening angle of the liftgate or door between the closed position and the open position. By defining the installation position as half of the opening angle of the liftgate or door, the spring energy store of the apparatus can be configured to provide same force reserves in both possible swinging directions when being in the installation position. The installation position normally corresponds to the position with the maximum moment need for support of the liftgate or door.

According to another advantageous feature of the present invention, the fixing step may include the step of inserting a safety pin into the tracker. Direct or indirect fixation of the coupling rod by insertion of a safety pin in the tracker permits a rapid release of the fixation by simply withdrawing the safety pin after the hinge lever impacted the coupling rod. Advantageously, the safety pin is arranged at a site that ensures easy accessibility from the interior space of the vehicle.

According to another advantageous feature of the present invention, the spring energy store of the apparatus can be configured as a torsion bar spring system comprised of several torsion bar springs which are arranged in parallel relationship and follow a meandering path and which are connected in fixed rotative engagement with one another. Advantageously, the torsion bar springs have a straight configuration and are connected to one another at their ends by couplers in a formfitting manner or by a material joint to form the torsion bar spring system. The couplers may advantageously be oriented substantially horizontal in a plane with uniform rotation angle in both directions, when the liftgate or door is in installation position and the torsion bar spring system is pretorsioned.

According to another advantageous feature of the present invention, the tracker connected to the torsion bar spring system may include a length-variable lever which is guided in a control cam and connected in fixed rotative engagement with a lever-proximal one of the torsion bar springs and on which the coupling rod is connected. Currently preferred is the attachment of the coupling rod directly on a sliding block assembly which may be configured to establish on the length-variable lever a sliding surface on which a slider may be movably arranged. The slider can support a cam roller which is guided by the control cam.

According to another advantageous feature of the present invention, the tracker may include a bearing bracket for support of the lever-proximal torsion bar spring and a bearing-proximal one of the torsion bar springs. The bearing bracket can also assume the function of a housing for protection of the components. The configuration of spring energy store and tracker renders the apparatus compact and thus allows optimum utilization of installation space and simplified installation in the vehicle.

According to another advantageous feature of the present invention, an adjustment device can be connected in fixed rotative engagement on the bearing-proximal torsion bar spring to influence the prestress of the torsion bar spring system. The adjustment device enables to take corrective measures of the prestress, if necessary, after installation of the apparatus, for example to compensate manufacturing tolerances of the components or varying gravity moments of the liftgate or door.

According to another advantageous feature of the present invention, a safety pin may be inserted into the tracker to secure the length-variable lever in relation to the bearing bracket. Fixation of the length-variable lever in relation to the bearing bracket by using the safety pin permits a particularly simple indirect fixation of the coupling rod. Torque generated by the prestressed spring energy store is intercepted at a very early point along the force path by the tracker so that the following components remain substantially force-free during storage and transport of the prestressed apparatus.

According to another advantageous feature of the present invention, two apparatuses may be arranged as mirror images in a roof zone of the vehicle, with each hinge lever connected to a marginal zone of the liftgate or door. The mirror-image arrangement of two apparatuses in the roof zone allows inconspicuous attachment with optimum utilization of the installation space and uniform support of the liftgate, for example a hatchback.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
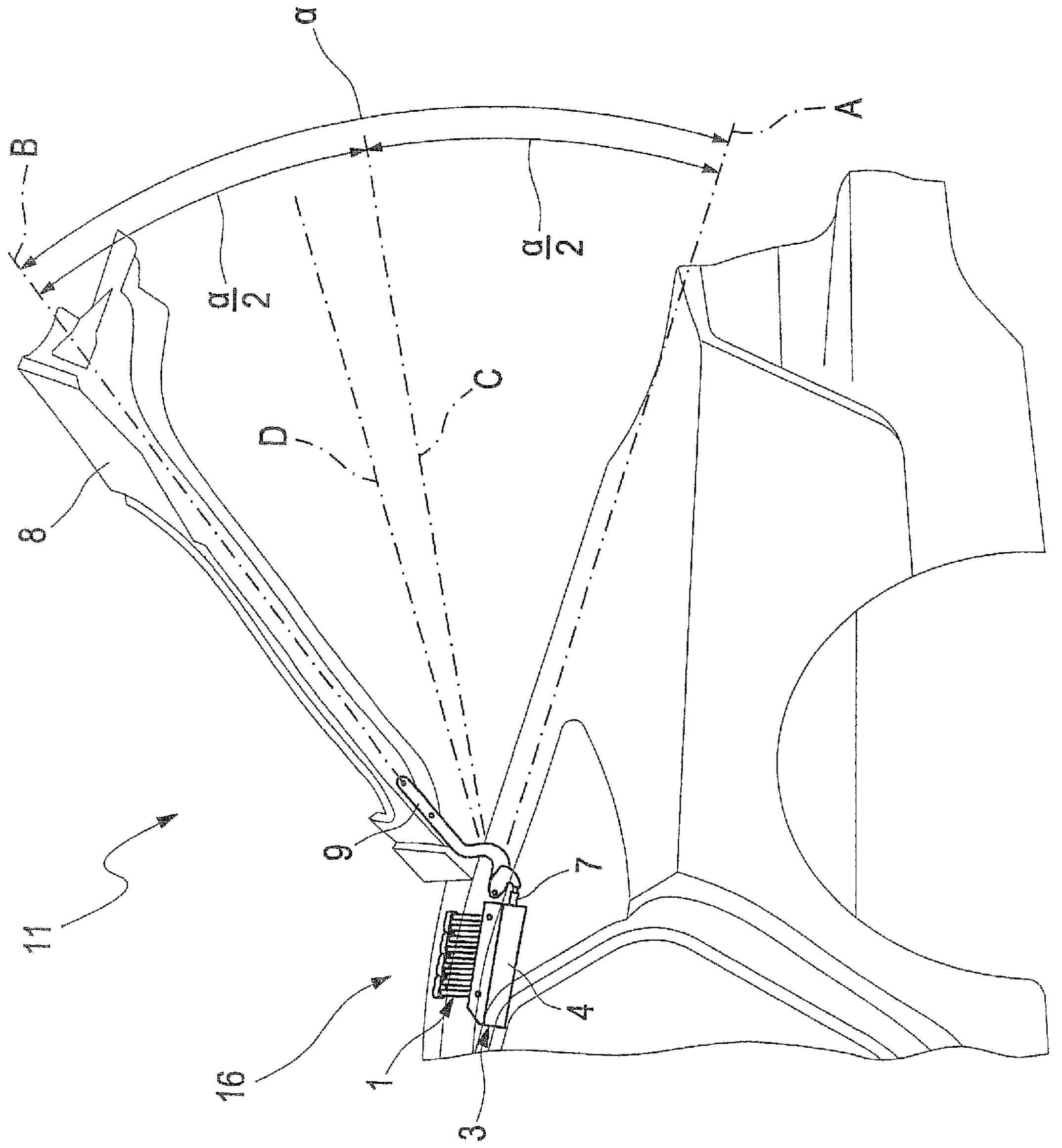
FIG. 1 shows a side view of a vehicle with installed apparatus for spring-assisted swinging of a liftgate.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown an apparatus, generally designated by reference numeral 16, installed in a vehicle 11 and provided for spring-assisted swinging of a liftgate or door 8. In the non-limiting example of FIG. 1, the liftgate or door is configured as hatchback. The hatchback 8 is swingably secured to a roof zone of the body of the vehicle 11 via hinge levers 9 on both sides of the vehicle 11. For convenience and sake of simplicity, the following description is made only in relation to one side of the vehicle 11. It will be understood by persons skilled in the art that the other side may also be equipped with an apparatus 16 associated to another hinge lever which however is not visible here and may also be secured to the roof zone. Thus, although the apparatus 16 will be described with respect to only one side of the vehicle 11, it will be understood that a same apparatus can be duplicated on the opposite side of the vehicle.

When assuming its closed position A, the hatchback 8 closes an opening in the body of the vehicle 11. Swinging the hatchback 8 about an opening angle α to assume an opening position B renders the opening accessible for allowing loading of the vehicle.

Figure 2:
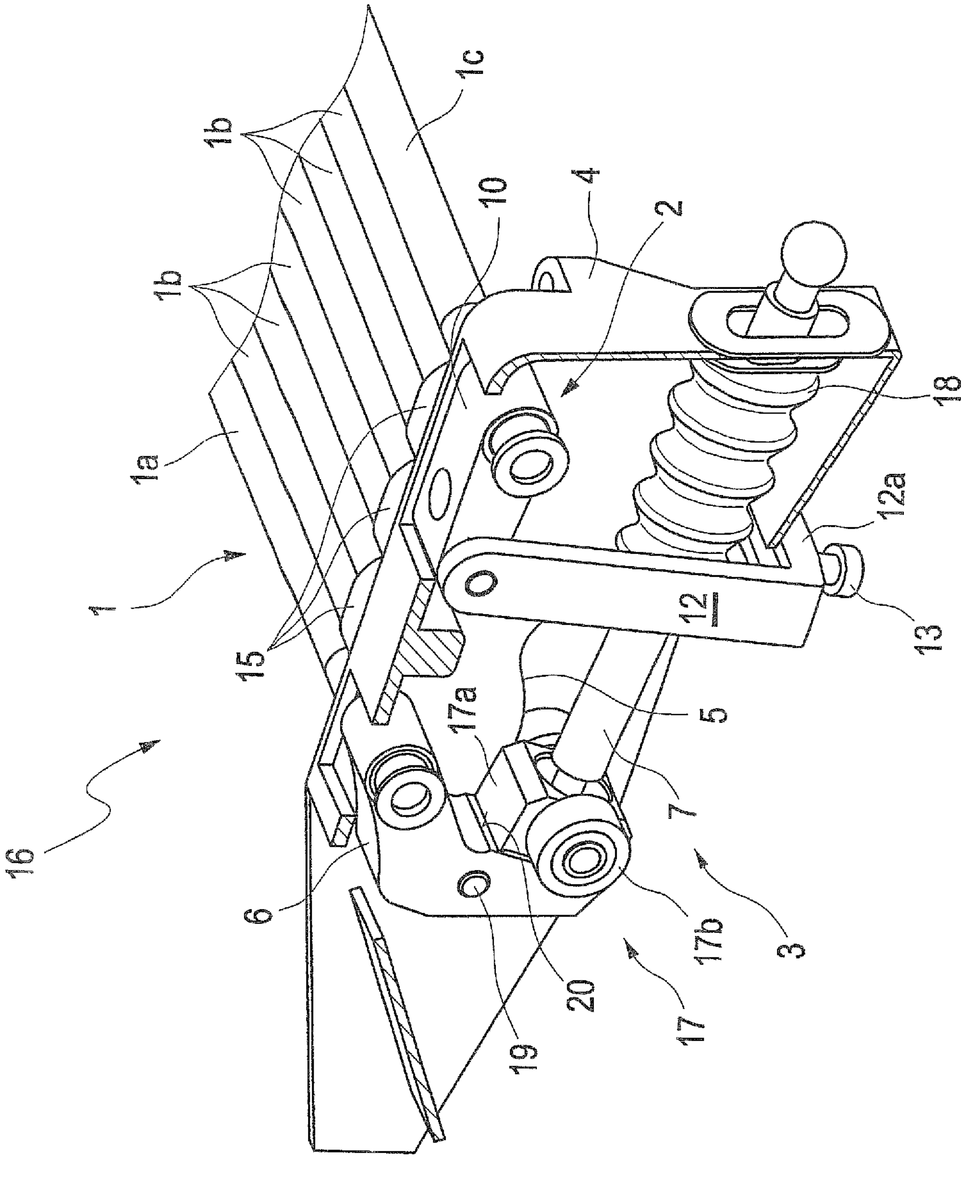
FIG. 2 shows a perspective illustration of the apparatus for spring-assisted swinging of a liftgate or door, using a tracker.

Turning now to FIG. 2, there is shown an enlarged detailed view of the apparatus 16. The apparatus 16 includes a torsion bar spring system, which is generally designated by reference numeral 1 and serves as spring energy store, and a tracker, which is generally designated by reference numeral 3 and is connected to the torsion bar spring system 1 for converting a torque generated by the torsion bar spring system 3 into a countermoment which is made available on the hinge lever 9 and acts in opposition to the gravity moment introduced by the hatchback 8. The tracker 3 has a coupling rod 7 which is connected to the hinge lever 9.

Installation of the apparatus 16 in the vehicle 11 is implemented by swinging the hatchback 8 to an intermediate position D between an installation position C and the open position B. The installation position C corresponds hereby to half the opening angle α of the hatchback 8 and/or the position with maximum countermoment. The already prestressed apparatus 16 which is secured in a defined position can then be mounted in the roof zone of the vehicle 11. The apparatus 16 is locked in such a way that the coupling rod 7 impacts the hinge lever 9 when the hatchback 8 assumes the installation position C. The coupling rod 7 and the hinge lever 9 are then connected to one another and at least one of the apparatuses 16 on opposite sides of the vehicle 11 is released.

According to FIG. 2, each apparatus 16 for spring-assisted swinging of a liftgate or door includes essentially the torsion bar spring system 1 and the attached tracker 3 which further includes an adjustment device 2, described in more detail further below. The torsion bar spring system 1 is comprised of several torsion bar springs 1*a*, 1*b*, 1*c* which are arranged in parallel relationship and connected in fixed rotative engagement via couplers 15 to define a meandering configuration. The outer torsion bar springs 1*a* and 1*c* are sized slightly longer than the inner torsion bar springsl b so as to be able to project into a bearing bracket 4 of the tracker 3. The bearing bracket 4 supports the outer torsion bar springs 1*a*, 1*c* in respective bearing seats and forms the housing for further components of the tracker 3. The length-variable lever 6 is connected in fixed rotative engagement on one side with the lever-proximal torsion bar spring 1*a* and guided in a control cam 5 via a sliding block assembly, generally designated by reference numeral 17. The sliding block assembly 17 includes a slider 17*a* which is supported on a slideway 20 of the length-variable lever 6 for displacement in a longitudinal direction, and a cam roller 17*b* which is rotatably received by the slider 17*a*. The cam roller 17*b* is guided in the control cam 5 substantially without play so as to be able to track the contour of the control cam 5 and thereby displace the slider 17*a* along the slideway 20. As an alternative, the mobility of the slider 17*a* may also be realized by using an oblong hole or by elastically supporting the sliderl 7*a* on or on the length-variable lever 6.

The coupling rod 7 is connected to the slider 17*a* and projects beyond the bearing bracket 4 to the outside in a sealing manner through provision of a sealing sleeve 18. The length-variable lever 6 may be secured temporarily by an insertable safety pin 19 to the bearing bracket 4. The adjustment device 2 includes an adjustment lever 10 which has one end connected in fixed rotative engagement with the bearing-proximal torsion bar spring 1*c* and another end rotatably connected with an angle clamp 12. The angle clamp 12 has an angled member 12*a* which extends underneath the bearing bracket 4 and supports an adjusting screw 13 which is supported in relation to the bearing bracket 4 such that actuation of the adjusting screw 13 causes a rotation of the adjustment lever 10 and thus a change in the torsion of the torsion bar spring system 1.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein.

What is claimed is:

1. A method for installation of an apparatus for spring-assisted swinging of a liftgate or door in opposition to a gravity force between a closed position and an open position on a body of a vehicle, with the apparatus including a spring energy store and a tracker which is coupled to the spring energy store for influencing a torque generated by the spring energy store, wherein a coupling rod associated with the liftgate or door and articulated on the body of the vehicle is rotatably actuated by a hinge lever of the tracker, said method comprising the steps of:

before installing the apparatus on the body of the vehicle, defining an installation position of the liftgate or door in the vehicle, wherein the installation position is intermediate between the closed position and the open position and corresponds to a position where a maximum counter torque is applied to the liftgate or door when the liftgate or door is subsequently installed on the body of the vehicle;

temporarily locking the coupling rod of the tracker in a prestressed position corresponding to the installation position;

holding the liftgate or door in the open position or in an intermediate position above the installation position;

mounting the apparatus on the body of the vehicle and connecting the hinge lever to a marginal zone of the liftgate or door;

lowering the liftgate or door from the open position or intermediate position into the installation position;

connecting the coupling rod to the hinge lever; and releasing the coupling rod from the locked position.

2. The method of claim 1, wherein the installation position corresponds to half of a full opening angle of the liftgate or door between the closed and open positions.

3. The method of claim 1, wherein the temporarily locking step includes the step of inserting a safety pin into the tracker.

4. The method of claim 1, wherein the spring energy store is configured as a torsion bar spring system comprised of several torsion bar springs arranged in parallel relationship and connected in fixed rotative engagement with one another to establish a meander-shaped configuration.

5. The method of claim 4, wherein the tracker includes a length-variable lever guided in a control cam and connected in fixed rotative engagement with a torsion bar spring proximal to the lever, said coupling rod being connected to the length-variable lever.

6. The method of claim 5, wherein the tracker includes a bearing bracket for support of the lever-proximal torsion bar spring and a torsion bar spring proximal to the bearing bracket.

7. The method of claim 6, further comprising the step of connecting an adjustment device in fixed rotative engagement with the torsion bar spring proximal to the bearing bracket to influence a prestress of the torsion bar spring system.

8. The method of claim 6, wherein the temporarily locking step includes the step of inserting a safety pin into the tracker, said safety pin securing the length-variable lever in relation to the bearing bracket.

9. The method of claim 1 for installation of two of said apparatus arranged as mirror images in a roof zone of the vehicle, further comprising the step of connecting the hinge lever associated with one of the two apparatus and a hinge lever associated with the other of the two apparatus to respective marginal zones of the liftgate or door.

* * * * *

UNITED STATES PATENT AND TRADEMARK OFFICE

CERTIFICATE OF CORRECTION

PATENT NO. : 8,635,757 B2
APPLICATION NO. : 13/161015
DATED : January 28, 2014
INVENTOR(S) : Bartsch et al.

It is certified that error appears in the above-identified patent and that said Letters Patent is hereby corrected as shown below:

On the Title Page

Item [57]

Line 4: after "holding the" add --liftgate--.

Signed and Sealed this
Third Day of June, 2014

Michelle K. Lee
*Deputy Director of the United States Patent and Trademark Office*